March 5, 1957  I. W. LOVELADY ET AL  2,783,854
GAS AND MULTIPLE LIQUID SEPARATOR APPARATUS
Filed May 12, 1954  2 Sheets-Sheet 1

ISAAC W. LOVELADY
SANFORD P. KROEKER
*INVENTOR.*

BY
Browning, Simms & Hyer
ATTORNEYS

March 5, 1957  I. W. LOVELADY ET AL  2,783,854
GAS AND MULTIPLE LIQUID SEPARATOR APPARATUS Filed May 12, 1954  2 Sheets-Sheet 2

ISAAC W. LOVELADY
SANFORD P. KROEKER
INVENTOR.

BY
ATTORNEYS

United States Patent Office 2,783,854
Patented Mar. 5, 1957

2,783,854

GAS AND MULTIPLE LIQUID SEPARATOR APPARATUS

Isaac W. Lovelady and Sanford P. Kroeker, Odessa, Tex., assignors to Sivalls Tanks, Inc., Odessa, Tex., a corporation of Delaware Application May 12, 1954, Serial No. 429,242

17 Claims. (Cl. 183—2.7)

This invention relates to improvements in separator apparatus and refers more particularly to the separation of a mixture of gas and two or more liquids having limited miscibility with each other. The apparatus of this invention is especially adapted for the separation of mixtures of petroleum gas and oil produced from oil and gas wells in admixture with or in an emulsion with water wherein the treatment requires heating for most efficient separation. The apparatus is also adapted for the treatment of similar mixtures which may occur in the course of refining hydrocarbon materials.

Many oil and gas wells produce fluids which are a mixture of petroleum gas and crude oil in the form of an emulsion with water, particularly salt water. The water may be bound up with the oil to form that which is known as a "tight" emulsion which is hard to break so as to permit separation between the oil and water. Also, in many instances, the well fluids include portions which may be termed "free water" and these portions are relatively easy to separate from the remainder of the fluids by simple settling procedures. It is generally desirable to separate the gas, oil and water components at or near the location of the production after which the components can be disposed of separately in accordance with conventional practices.

It is an object of this invention to provide separator apparatus including a single tank particularly well adapted for the separation of well fluids containing tight emulsion and free water, in which the tight emulsion may be heated to effect separation thereof with only a minimum of fuel consumption.

Another object is to provide apparatus of the type described in the foregoing object in which the free water may be separated from the well fluids prior to heating of the tight emulsion and conducted to an outlet from the tank without substantial heat exchange with the heated emulsion.

Still another object is to provide apparatus of the type above described in which the initially separated free water and water separated by heating from the tight emulsion may be removed from the tank through a common outlet.

A further object is to provide separator apparatus of the type above described in which the well fluids may be introduced into the tank toward one end thereof and removed therefrom toward an opposite end, and further in which the free water and heated emulsion may be conducted longitudinally of the tank between opposite ends with only a minimum of heat exchange with one another.

A still further object is to provide separator apparatus especially well adapted for separating well fluids containing free water and tight emulsion, in which the free water may be initially separated from the fluids and the tight emulsion subsequently separated by heating into oil and water, wherein the free water and heated emulsion are insulated from one another during transmission through the tank to outlets therefor by a layer of relatively cool lighter liquid.

A still further object is to provide separator apparatus including a substantially horizontally disposed tank and a heater disposed therein for effecting separation of tight emulsion into oil and water, wherein baffle means are so arranged within the tank as to cause the emulsion to flow over the heater in an improved manner.

A still further object is to provide apparatus of the character described in the foregoing object, in which free water may be initially separated from the well fluids and the free water and heated emulsion conducted longitudinally of the tank to outlets therefrom, wherein the baffle means further serves to establish a layer of insulating liquid between the free water and heated emulsion.

Other objects, advantages and features of this invention will be apparent to one skilled in the art upon a consideration of the written specification, the attached claims and the annexed drawings, wherein:

Figure 1:
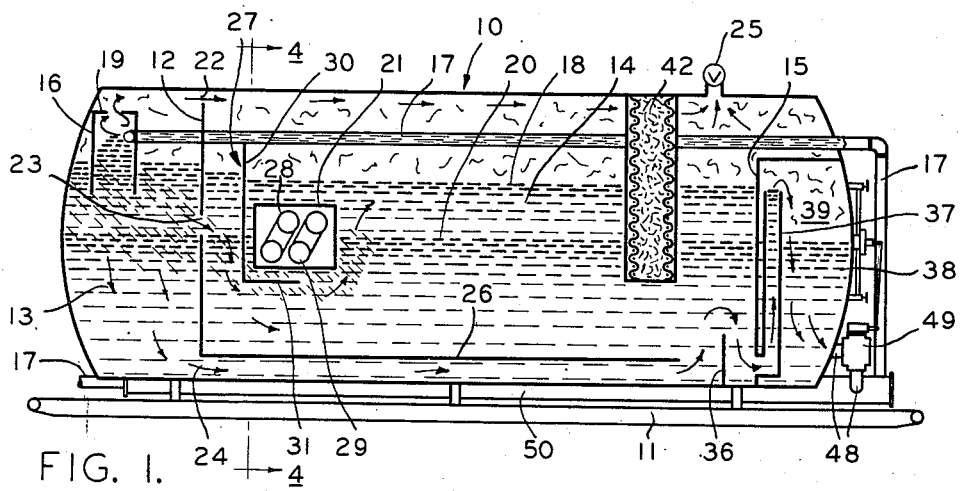
Fig. 1 is a diagrammatic longitudinal sectional view of one form of the separator apparatus.

The separator apparatus of the present invention is a continuation-in-part of our copending application, entitled "Gas and Multiple Liquid Separator Apparatus," Serial No. 253,914, which was filed October 30, 1951, and now issued as Patent No. 2,706,531. Similarly to the separator of the present invention, in the earlier application means were provided for by-passing the "free water" past the heated liquids without substantial heat exchange therewith, but joining said "free water" with water separated out of the emulsion by heat prior to discharge of the water from the tank, such that only a single outlet was required. However, in the present invention, the afore-mentioned novel features are incorporated, along with additional novel features, into an apparatus which comprises only a single tnak or vessel, thereby affording a substantial saving and simplicity of operation.

Referring now specifically to the drawings, each form of separator apparatus comprises a horizontally disposed cylindrical tank or vessel 10 which is closed except for an inlet and outlets to be described and which is supported along the bottom upon skids 11 or other suitable framework. The gas and multiple liquid mixture to be treated, which is generally water, petroleum oil and gas and including an oil-water emulsion, is introduced into the tank 10 toward its inlet (leftmost in Figs. 1 to 3) end and discharged in its separate phases or components toward its outlet (rightmost in Figs. 1 to 3) end.

The tank is divided lengthwise by a vertical baffle or partition 12 intermediate its ends and extending thereacross into first and second zones 13 and 14 on the inlet and outlet sides, respectively, of the baffle. The first zone comprises a "free water" knockout section in which the easily separated heavier liquid or water is initially separated from the rest of the mixture or well fluids. In the second zone are arranged, in order, a heating section, a quiescent or settling section, and an outlet section, the latter being separated from the quiescent section by a vertical wall 15, the function of which will be apparent hereinafter.

Figure 2:
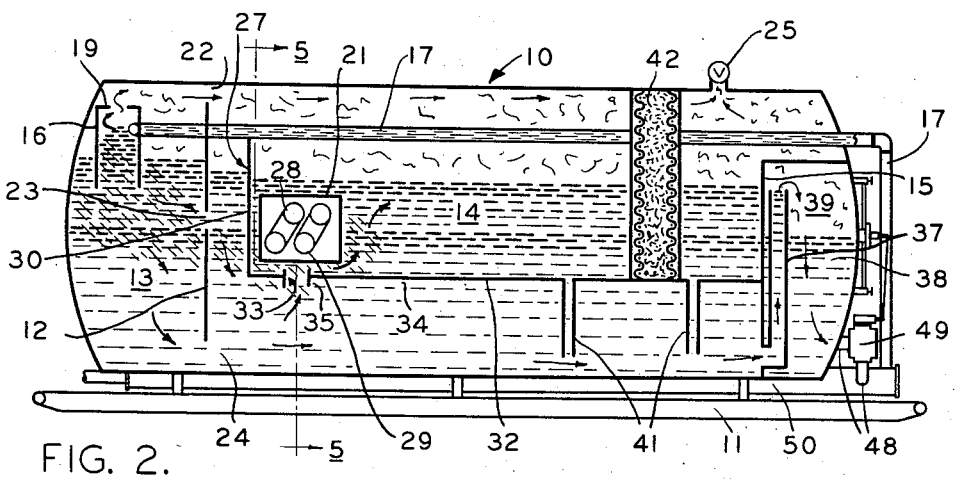
Fig. 2 is a view similar to Fig. 1 of a preferred form of the apparauts.
Figure 6:
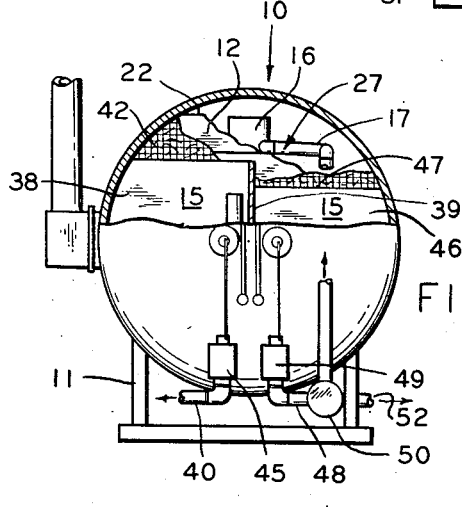
Fig. 6 is a view of the outlet end of the apparatus of any one of the above figures, with the upper portion of parts of the apparatus broken away.

The mixture to be treated is introduced into a centrifugal separator shell 16 in the free water knockout zone 13 through an inlet conduit 17 which passes through a wall of the tank from a point exteriorly thereof. The end of this conduit is connected to and communicates with the shell 16 tangentially thereof, as best shown in Figs. 1, 2 and 6. As shown, the shell is preferably cylindrical and is located vertically upright within the zone 13 so that its open upper end extends above the liquid level in this zone of the tank, governed by the liquid level 18 in zone 14, and its open lower end is submerged in the liquid. By this arrangement, gas is prevented from passing under the lower edge of the shell and, therefore, agitation in this zone is at a minimum. To the contrary, the gas travels upwardly through the shell and out through its upper end, which is provided with an inturned, annular flange 19 adapted to prevent, insofar as possible, the flow of liquids from this upper end of the shell and thereby prevent undue entrainment of liquid droplets in the gas flowing out of the upper end and occupying the space above the liquid level.

In the types of mixtures previously mentioned, for which the apparatus of the present invention is particularly well adapted in treating, there is contained a component or phase which is relatively easily separated from the other components of the mixture by settling. For example, when treating oil-water emulsions, a part of the water in the emulsion may be easily separated. In accordance with the present invention, this easily separable or "free" water settles from the shell 16 down to the bottom of the first zone 13 and reaches a level substantially as indicated at 20. It will be noted that this first zone is of sufficient volume to provide for settling of this "free water" therein. According to one novel aspect of this invention, this easily separated water in the first zone 13 is conducted to its outlet at the opposite end of the tank and beyond the vertical wall 15 without substantial heat exchange with the lighter phase or oil and "tight" emulsion of the mixture which requires heating in the zone 14 of the tank, in a manner to be described. In this manner, the load on the heating apparatus and fuel requirements of the tank is maintained at a minimum.

The baffle 12 is interrupted at 22, 23 and 24 at different levels across the tank and, in combination with suitable liquid and liquid interface level maintaining means to be described, serves to conduct the gas in the first zone 13 to its outlet; the "free water" past the heating zone without substantial heat exchange; and the lighter liquid, comprising, in this case, oil and oil-water emulsion, to a heater 21. More particularly, interruption 22 extends across the tank at its uppermost level and above the liquid level whereby gas separated in zone 13 may pass into zone 14 and be discharged through a valved outlet 25 which is operable to maintain the desired pressure within the tank. The interruption 23 is intermediate interruptions 22 and 24 and approximately at the liquid interface level 20 for conducting the lighter liquid from zone 13 to the heater 21.

Figure 4:
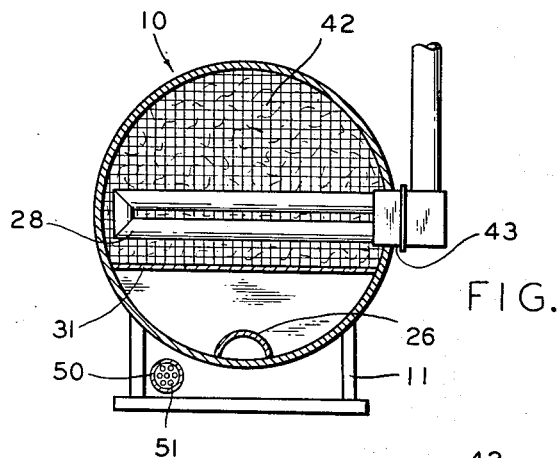
Fig. 4 is a cross-sectional view of the separator of Fig. 1, taken substantially along broken line 4—4.

The lowermost interruption 24 extends across the baffle 12 between the lowermost level of the tank and the interface level 20. As can be seen from the drawings, in each form of the separator apparatus, the easily separated liquid passes from the zone 13 through the interruption 24 and then through conduit means directly to its outlet at the opposite end of the tank. In the form of separator shown in Figs. 1 and 4, this conduit means comprises a curved plate 26 attached to the lower level of the tank and connecting with the interruption 24 of the baffle. This plate extends longitudinally almost the entire length of the zone 14 at a substantial depth below the liquid interface level 20 and heater 21, so that only a small amount of heat from the heated liquid in the zone will be absorbed by the water conducted through the conduit.

The lighter liquid is conducted through the interruption 23 into the zone 14, where it is directed by a heater baffle 27 to cause it to flow over the tubes 28 and 29 of the heater 21 in an improved manner. For this purpose, the baffle 27 of the separator of Fig. 1 comprises a vertical portion 30 and a substantially horizontal portion 31 which extends downstream from the lower end of the vertical portion and terminates intermediate the tubes of the heater. Also, the vertical baffle portion extends above the liquid level 18. In this manner, liquid passing through interruption 23 is caused to flow under the baffle 27 and upwardly along the heater. Upon flow over the heater, this lighter liquid is heated and separated into its oil and water phases, each of which assumes its level in the settling section downstream of the heater.

Figure 3:
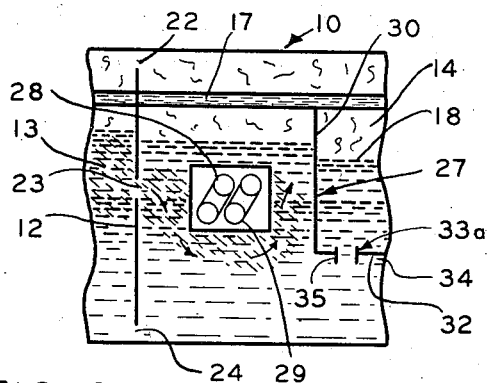
Fig. 3 is a partial view similar to Figs. 1 and 2 of a modification of the preferred form of the apparatus shown in Fig. 2.

Alternatively, and as will be understood in connection with Fig. 3, the baffle 27 may be located downstream of the heater, but with its upper and lower levels approximately as shown in Fig. 1. In this case, the lighter liquid would be caused to flow down over the heater tubes and pass under the baffle 27 after being heated.

Figure 5:
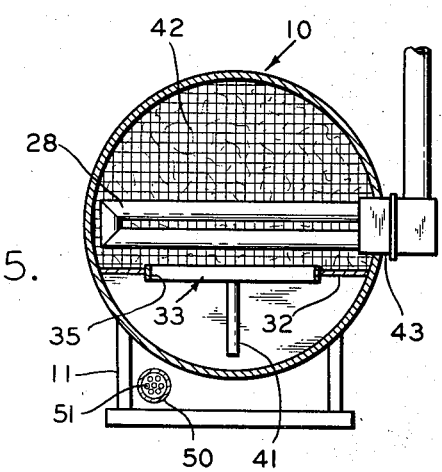
Fig. 5 is a cross-sectional view of the separator of Fig. 2, taken substantially along broken line 5—5.

With reference to the preferred form of separator shown in Fig. 2, it can be seen that the horizontally extending plate 32, which projects downstream from vertical baffle portion 30 to wall 15, corresponds in part to the horizontal baffle portion 31 of Fig. 1 in that it is below the liquid interface level and directs the lighter liquid from interruption 23 to flow over the heater 21. In addition, however, the plate 32 provides a conduit means for conducting the easily separated liquid or "free water" from the interruption 24 to its outlet without substantial heat exchange with the heated liquid in zone 14. There is provided through the plate 32 beneath the heater (Fig. 2) a passage means 33 which acts, similarly to the downstream edge of baffle portion 31 in Fig. 1, to direct the lighter liquid upwardly along the heater tubes. As best shown in Fig. 5, this passage means extends a major portion of the length of the tubes.

According to a further novel concept of this invention, the plate 32 is provided with weir means which forms a layer or blanket 34 of unheated lighter liquid between the plate and the heavier liquid or water flowing through the conduit means below the plate. In this manner, an interface is established between the free water and the heated liquid in zone 14 and further insulation is provided against heat absorption by the free water.

Preferably, this weir means comprises a downwardly extending rim 35 on the passage means 33. It will be understood that this rim, which extends around the periphery of the passage means, will cause a layer of lighter liquid from the interruption 23, and indicated at 34, to accumulate under the entire length of the plate 32. Of course, when the lighter liquid layer accumulates a thickness greater than the rim 35, it will spill over into the passage means 33. In this manner, oil settling out within the conduit means has access to the zone 14. In the modification of this separator shown in part in Fig. 3, the baffle 27 is disposed downstream of the heater 21 such that the lighter liquid flows downwardly over the heater tubes. Thus, the passage means 33a of this modification is not beneath the heater but slightly downstream of the vertical baffle portion 30. As well, the layer 34 does not extend beneath the heater and, therefore, is not as effective as is the layer in the form of Fig. 2.

In each form of separator, there are passage means toward the outlet end of the zone 14 which provide communication between water separated in this zone and the initially separated free water flowing through the conduit means. In this manner, water which separates out of the heated emulsion in the quiescent settling section of the zone 14 may be joined with the free water in the conduit means for discharge from a common outlet.

In the separator of Fig. 1, this passage means comprises merely the interruption of the plate 26 short of the wall 15. Additionally, there may be provided between the interruption and wall a vertical baffle 36. The path of flow of the joined or communicating bodies of separated water is indicated by arrows in Fig. 1. As shown therein, an overflow pipe 37 extends through the wall 15 adjacent its lower end to communicate with the water flow below the liquid interface level 20. This water thus enters the pipe 37 and overflows into the water outlet chamber 38 defined by the dividing wall 39, from which it is discharged from the tank through outlet 40.

In the preferred form of separator of Fig. 2, the aforementioned passage means comprises one or more pipes 41 which extend downwardly from the plate to a level below the layer 34. As shown, both pipes are disposed toward the downstream end of settling section of zone 14. As well, this form of separator is provided with an overflow pipe 37 communicating with the joined water flow and additional apparatus providing a common outlet therefor.

In the section of the zone 14 downstream of the principal settling section, and preferably upstream of the gas outlet 25, there is provided a filter 42 extending across the width of the tank and extending downwardly from the top thereof to at least the liquid interface level. This filter is filled with wood excelsior or other suitable filtering media. Its upper portion above the liquid level acts as a mist extractor for the gas and prevents the carry-over of liquid particles from the tank. The termination of the filter short of the bottom of the tank allows at least a substantial portion of the water to be discharged without passing therethrough, and thus avoids plugging of the filter due to the deposition of carbonaceous material and salt.

Referring briefly to certain details of the heater 21, which may be of conventional construction, it can be seen that it is side-mounted and inserted into the tank through a flanged conduit 43. The tubes 28 and 29, which extend through the conduit 43, extend across substantially the entire width of the tank and are at a level vertically within the tank such that at least the upper tubes are covered with the lighter liquid so that heat is applied directly thereto.

As shown in Figs. 1 and 2, the upper end of the overflow pipe 37 extends above the controlled level of water accumulated in outlet chamber 38. The elevation of this upper end of the pipe may be adjusted as desired to provide a means of maintaining a predetermined liquid interface level 20. The liquid level within the compartment 38 is maintained at the desired level by a valve 45 in the outlet 40, which valve may be of a type mechanically operated by a float (not shown) or by conventional level head control.

An oil outlet chamber 46 (Fig. 6) is provided on the opposite side of dividing wall 39 to receive and accumulate the separated oil flowing from the settling section of the zone 14 and over the weir 47 defined by the lowered upper edge of the wall 15. This weir therefore maintains the predetermined liquid level 18 in the tank. Outlet is provided from the chamber 46 through conduit 48 and the level of accumulated oil in this chamber is maintained at a suitable level below weir 47 by a valve 49 similar to the valve 45 and disposed in the outlet 48.

The inlet conduit 17 enters the tank at its outlet end and extends substantially the entire length thereof to the point at which it connects tangentially with the shell 16 to introduce the mixture to be separated into the tank. As shown, this inner length of conduit is disposed in the upper portion of the tank and absorbs heat from the heated fluids along the largest portion of its length. Also, the inlet conduit 17 is extended through a counter-flow heat exchanger 50 below the tank prior to entry into the tank, whereby the incoming fluids absorb heat from the heated oil discharged through the outlet 48.

Thus, as shown in Fig. 1, the inlet conduit 17 connects with the heat exchanger 50 at its left end adjacent the inlet end of the tank, whereby the well fluid is conducted through the pipes 51 of the exchanger to a point at the exchanger end adjacent the outlet of the tank where it re-enters conduit 17 and continues upwardly to the point of entry into the tank. The heated oil from outlet 48 enters the heat exchanger at its outlet end (Figs. 1, 2 and 6) and is conducted therethrough around the pipes 51 in heat exchange with the incoming fluids to a point adjacent the inlet end of the heat exchanger, from which it is discharged through conduit 52 (Fig. 6).

It will be understood that the apparatus of the present invention has been shown diagrammatically in many respects and that conventional apparatus, such as access manways and the like, may be provided for access to different portions of the tank. It will also be understood that the various valve and level controls may be replaced by conventional equivalent means and are shown diagrammatically merely for illustrative purposes.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gas and multiple liquid separator which comprises, in combination, a horizontal tank, a baffle extending across the tank to define first and second zones therein, an inlet for introducing the gas and multiple liquid from the exterior of the tank into the first zone, means in said first zone for initially separating a lighter liquid and gas from a heavier liquid of the gas and multiple liquid so introduced, liquid outlets toward one end of the second zone, a gas outlet from the tank, a heater intermediate the baffle and liquid outlets and spaced sufficiently from the latter to provide a quiescent section therebetween, interruptions in the baffle permitting passage from the first to the second zone of each of the initially separated gas and heavier and lighter liquids, means for maintaining predetermined liquid and heavier and lighter liquid interface levels in said tank, and conduit means extending substantially longitudinally of the tank between the baffle and liquid outlets thereof for conducting the initially separated heavier liquid from its baffle interruption to its outlet without substantial heat exchange with the heater, said conduit means having its uppermost level below the heater and the predetermined heavier and lighter liquid interface level.

2. A gas and multiple liquid separator of the character defined in claim 1, including means communicating the lowermost portion of the quiescent section with the conduit means toward the end of the quiescent section nearest the liquid outlets.

3. A gas and multiple liquid separator of the character defined in claim 1, including means providing a layer of lighter liquid between the initially separated heavier liquid conducted through the conduit means and the heated heavier liquid above the uppermost level of the conduit means.

4. A gas and multiple liquid separator of the character defined in claim 1, including a filter in the quiescent section between the heater and gas outlet, said filter extending vertically downward from the uppermost portion of the tank to at least the predetermined heavier and lighter liquid interface level.

5. A gas and multiple liquid separator of the character defined in claim 1, including a heater baffle in the second zone, said heater baffle being spaced from and substantially opposite the baffle interruption for the initially separated lighter liquid.

6. A gas and multiple liquid separator of the character defined in claim 5, said heater baffle being disposed between the baffle and the heater.

7. A gas and multiple liquid separator of the character defined in claim 5, said heater baffle being disposed between the heater and the quiescent section.

8. A gas and multiple liquid separator which comprises, in combination, a horizontal tank, a substantially vertically disposed baffle extending across the tank to define first and second zones therein, a centrifugal separator shell in the first zone, an inlet for introducing the gas and multiple liquid from the exterior of the tank into the shell, whereby a lighter liquid and gas are initially separated from a heavier liquid of a gas and multiple liquid mixture introduced into the shell, a liquid outlet toward one end of the second zone for each of the heavier and the lighter liquids, a gas outlet from the tank, interruptions in the baffle permitting passage from the first to the second zone of each of the initially separated gas and heavier and lighter liquids, a heater intermediate the baffle and liquid outlets and substantially opposite the baffle interruption for the initially separated lighter liquid, said heater being spaced sufficiently from the outlets to provide a quiescent section therebetween, means for maintaining a predetermined liquid level in the tank and a predetermined heavier and lighter liquid interface level in the second zone of the tank intermediate the upper and lower extremities of the heater, and a plate in the second zone intermediate the baffle and liquid outlets and extending substantially horizontally across the tank on a level below the lower extremity of the heater and above the lowermost portion of the baffle interruption for the initially separated heavier liquid, whereby initially separated heavier liquid from the first zone may be conducted beneath the plate to its outlet without substantial heat exchange with the heater.

9. A gas and multiple liquid separator of the character defined in claim 8, wherein passage means is provided through the plate toward the end of the quiescent section nearest the liquid outlets.

10. A gas and multiple liquid separator of the character defined in claim 8, said plate extending in a longitudinal direction from the baffle to a point in that portion of said quiescent zone nearest the liquid outlets.

11. A gas and multiple liquid separator of the character defined in claim 8, wherein the plate is spaced from said baffle and is provided with a heater baffle portion at its end nearest the baffle, which heater baffle portion extends upwardly to a level above the predetermined liquid level, said plate having passage means therethrough toward the end thereof nearest the baffle.

12. A gas and multiple liquid separator of the character defined in claim 11, including means providing a layer of lighter liquid between the initially separated heavier liquid beneath the plate and the heated heavier liquid above the plate.

13. A gas and multiple liquid separator of the character defined in claim 12, said layer providing means comprising weir means associated with the passage means through the plate toward the end thereof nearest the baffle.

14. A gas and multiple liquid separator of the character defined in claim 13, said heater baffle portion being disposed between the baffle and the heater, and the passage means through the horizontal plate being disposed beneath the heater.

15. A gas and multiple liquid separator of the character defined in claim 13, said heater baffle portion being disposed in the quiescent section of the second zone more nearly adjacent the heater than the liquid outlets.

16. A gas and multiple liquid separator which comprises, in combination, a horizontal tank, a substantially vertical baffle extending across the tank to define the first and second zones therein, an inlet for introducing the gas and multiple liquid from the exterior of the tank into the first zone, means in said first zone for initially separating a lighter liquid and gas from a heavier liquid of the gas and multiple liquid so introduced, liquid outlets toward one end of said second zone, a gas outlet from the tank, interruptions in the baffle permitting passage from the first to the second zones of each of the initially separated gas and heavier and lighter liquids, a heater intermediate the baffle and liquid outlets and disposed substantially opposite the interruption for the initially separated lighter liquid, said heater being spaced sufficiently from the liquid outlets to provide a quiescent section therebetween, means for maintaining a predetermined liquid level in the tank and a predetermined heavier and lighter liquid interface level intermediate the upper and lower extremities of the heater, and a heater baffle between the interruption for the initially separated lighter liquid and the heater, said heater baffle extending substantially vertically across the tank and having its upper edge above the liquid level and its lower edge below the lower extremity of the heater.

17. A gas and multiple liquid separator of the character defined in claim 16, said heater baffle being provided with a substantially horizontal plate portion below the lower extremity of the heater, said plate portion extending toward the liquid outlets to a point beneath the heater, whereby the initially separated lighter liquid is caused to flow upwardly along the heater.

References Cited in the file of this patent

UNITED STATES PATENTS

| 2,474,475 | Glasgow | June 28, 1949 |
| 2,601,903 | Erwin | July 1, 1952 |
| 2,601,904 | Erwin | July 1, 1952 |
| 2,610,698 | Lovelady et al. | Sept. 16, 1952 |
| 2,614,649 | Walker et al. | Oct. 21, 1952 |
| 2,656,006 | Wilson | Oct. 20, 1953 |
| 2,664,170 | Walker et al. | Dec. 29, 1953 |
| 2,664,963 | Lovelady et al. | Jan. 5, 1954 |